July 21, 1959   M. L. BIER   2,895,626
SCRAPER ATTACHMENT FOR SILO UNLOADER
Filed Nov. 19, 1957

Merlin L. Bier
INVENTOR.

BY *[signatures]*
Attorneys

2,895,626

SCRAPER ATTACHMENT FOR SILO UNLOADER

Merlin L. Bier, Alexander, Iowa

Application November 19, 1957, Serial No. 697,447

2 Claims. (Cl. 214—17)

This invention relates, broadly speaking, to improved means for scraping, cutting and effectively clearing packed or frozen silage from the wall portions of a silo, and pertains, more particularly, to a simple, practical and efficient special-purpose readily applicable cutter-head which is so designed and constructed that it may be effectually and easily joined to the outer end of the auger or screw-conveyor which serves as a part of a power-driven silage or silo unloader.

As is apparent from the above introduction or statement of the invention, silo unloaders of many types are currently in use. One such unloader is that disclosed in the Van Dusen Patent 2,719,058. With reference to this patent the reader will note that a vertically lowerable rotating sweep-type silage gathering structure acts to pick up the silage and deliver it to centralized accumulating means having a suitable discharge or emptying hose or equivalent conduit. The screw-conveyor is appropriately housed in a silage channeling shield having a bracket on its outer end carrying an idling roller. The roller travels around in rolling contact with the inner surface of the silo-wall.

The object of this invention is to properly solve the problem of more satisfactorily loading and delivering all of the silage, particularly the marginal portions thereof contiguous to the silo-wall. The trouble has been that the silage close to said wall is often solidly packed and just as often frozen and is frequently hard to load and move. Therefore, in order to meet and cope with the challenge a simple solution turns out to be appropriating and aptly using a simply but suitably constructed cutter-head. By interposing and installing the cutter-head between the terminal outer ends of the shield and conveyor and fastening it in line with the conveyor, remarkable and highly efficient scraping, cleaning and clearing of hard-to-move silage has been accomplished.

No ordinary cutter-head will do. By trial and error and repetitional experimentation the specific adaptation herein revealed does precisely what is desired and should undoubtedly meet with widespread adoption and use. To this end a preferred embodiment of the concept takes the form of a ready-to-use attachment for the outer end of the shielded auger-type conveyor. It comprises a cutter-head having an axial shaft adapted to be operatively joined to the outer end of the shaft portion of said conveyor, scraper blades mounted on the outer surface of said head, cutter blades mounted on the peripheral portion of the head, and anti-clogging, silage agitating and cleaning fins mounted on the inner surface of the head.

Novelty is also predicated on the construction stated and wherein the head proper comprises a solid metal disk, said scraper blades being lateral to the outer flat surface of the disk, being circumferentially spaced, and having their outer ends flush with the outer periphery of the disk and their inner ends spaced from the axial hub portion of the disk, said cutter blades being removably applied and attached to said outer surface, located in the spaces between the scaper blades and having cutting edges projecting at circumferentially spaced positions beyond said outer periphery, said anti-clogging fins being fixed to the inner surface of the disk, being in planes at right angles to said inner surface, circumferentially spaced, having their inner ends spaced from the axial shaft, and their outer ends projecting beyond said outer periphery.

Other objects, features and advantages will become more readily apparent from the drawing and specification which follows:

Figure 1:
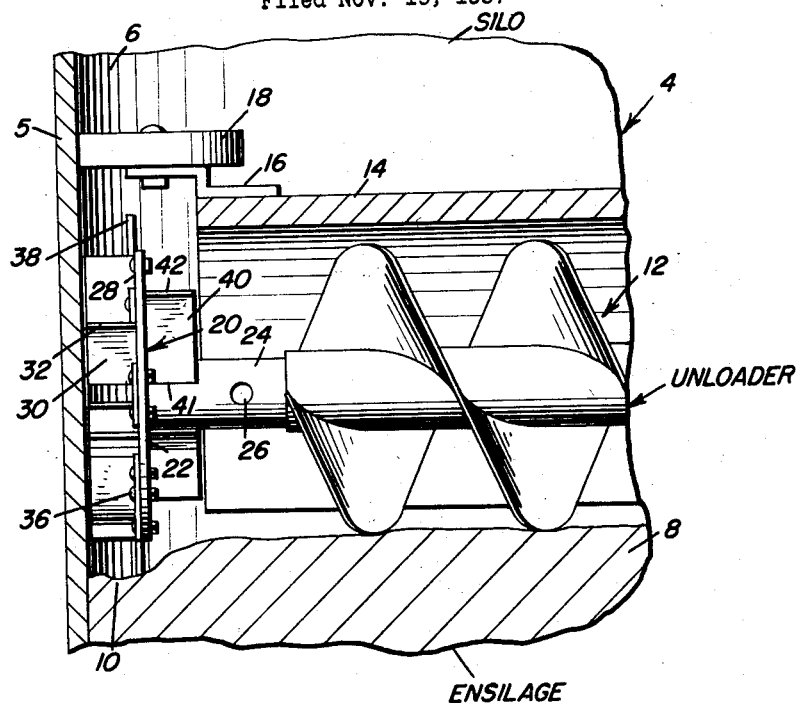
Fig. 1 is a view showing fragmentary portions of a conventional silo loaded with silage (or ensilage), the roller-equipped shield, end portion of the associated auger-conveyor, and the improved cutter-head attachment and how it is constructed, attached and used.
Figure 2:
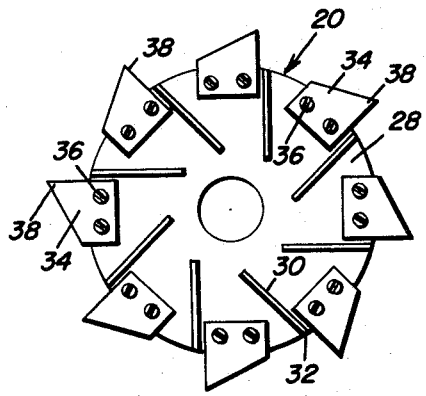
Fig. 2 is an end elevation of the cutter-head looking at the outer side or face and detailing the scraper blades and cutter blades.
Figure 3:
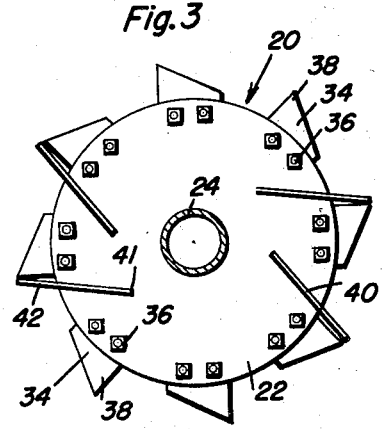
Fig. 3 is a similar view but showing the opposite or inner face and the agitating and anti-clogging fins or blades thereon.

By way of introduction to the description of the details it is to be pointed out that novelty is predicated not only on the device in the sense that it is a ready-to-use attachment, but also on the combination of such a device with the outer roller-equipped end of the conveyor housing or shield and the cooperating end portion of the conveyor, wherein the device is interposed in the space between the ends of the shield and screw conveyor, is situated beneath the roller and operates contiguous to the wall of the silo.

In the drawing the silo is denoted generally by the numeral 4 and a fragmentary portion of the wall thereof is denoted at 5 and the interior wall surface at 6. The material to be moved, either silage or ensilage, is denoted at 8 and the marginal portion of which is directly effected by this invention is denoted at 10. The screw conveyor, which is a conventional spiralling type is denoted at 12 and the cooperating channel-shaped end portion of the shield or guard is denoted at 14. The aforementioned bracket on the end of the guard 16 carries the idling roller 18 which rides around the surface 6 in a now generally well-known manner. If further particulars are necessary in respect to the lifting and lowering and powering features, reference may be had to Patent 2,719,058. Since all these particulars are not necessary here they are not shown.

The attachment is referred to generally as a cutter head and is denoted by the numeral 20. Specifically it comprises a disk-like plate or metal disk which is relatively thin but sufficiently strong for the purposes. This is provided at its center on the inwardly facing side 22 with an adapter shaft 24 connectable with the shaft of the conveyor. This shaft extends from the exact center and fits in the pipe that is usually used in an auger and a bolt is inserted through the shaft and auger at 26 in Fig. 1. The invention may be used vice versa, that is with an auger having a solid shaft and a pipe can be welded to the head and fastened in the same manner. With reference to the outer side of the disk at 28 it will be seen that the flanges 30 which are rigidly fastened in place have their outer ends 32 flush with the outer periphery of the disk. The inner ends are spaced radially from the hub portion or center of the disk. These flanges are circumferentially spaced and constitute the aforementioned scraper blades. Positioned between them are the flat plate-like members 34 which constitute cutter blades and these are screwed or otherwise fastened in place at 36 in the spaces between the blades 30. The outer cutter ends 38 project beyond the periphery. On the other side I provide the anti-clogging blades or fins and these are denoted by the numerals 40 and are fixedly mounted and circumferentially spaced. The inner ends 41 are spaced from the hub center and the outer ends 42 project beyond the peripheral edge. It will be evident that the ability of this head to clean and clear is predicated to some extent on the open center and experiments have shown that this is indeed not only a satisfactory construction but one which is highly efficient and effectually operable.

The mode of attachment and operation will be plain, by considering Fig. 1.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An attachment for the outer end portion of a shielded auger-type conveyor used in conjunction with a silage unloader comprising a cutter head having an axial shaft adapted to be operatively joined to the outer end of the shaft portion of said conveyor, scraper blades mounted on the outer surface of said head, cutter blades mounted on the peripheral portion of the head, and anti-clogging, silage agitating and cleaning fins mounted on the inner surface of the head.

2. The structure defined in claim 1, and wherein the head proper comprises a solid metal disk, said scraper blades being lateral to the outer flat surface of the disk, being circumferentially spaced, and having their outer ends flush with the outer periphery of the disk and their inner ends spaced from the axial hub portion of the disk, said cutter blades being removably applied and attached to said outer surface, located in the spaces between the scraper blades and having cutting edges projecting at circumferentially spaced positions beyond said outer periphery, said anti-clogging fins being fixed to the inner surface of the disk, being in planes at right angles to said inner surface, circumferentially spaced, having their inner ends spaced from the axial shaft, and their outer ends projecting beyond said outer periphery.

References Cited in the file of this patent
UNITED STATES PATENTS 2,719,058  Van Dusen _____ Sept. 27, 1955